Jan. 18, 1955
L. E. FLORY
2,700,151
ELECTRICAL PULSE ANALYZER
Filed Oct. 28, 1949
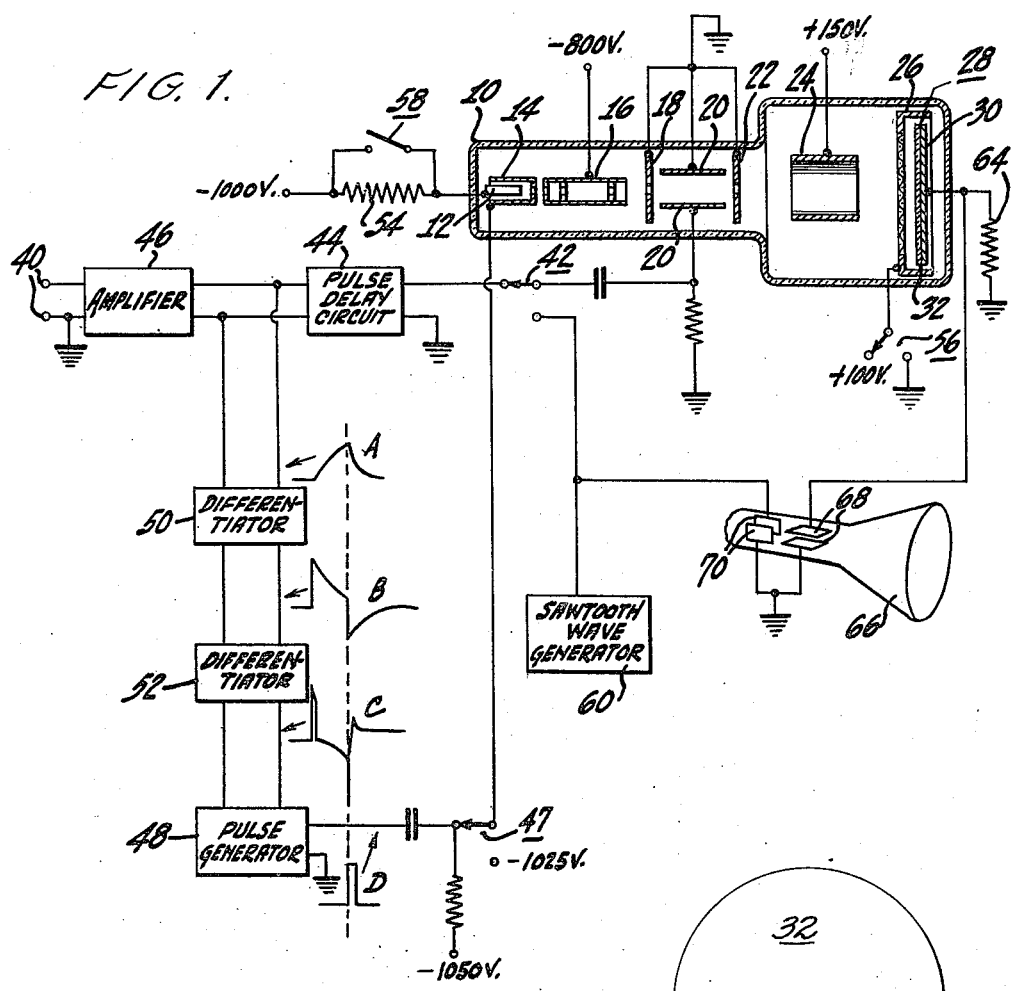
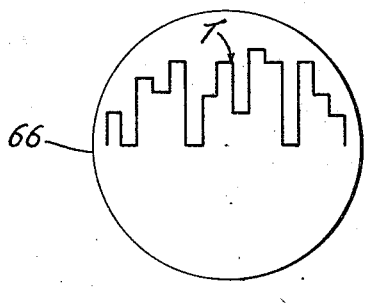
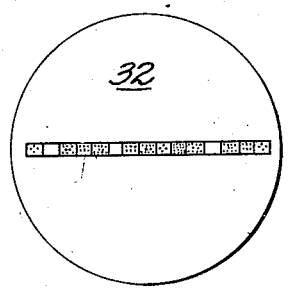
Inventor
LESLIE E. FLORY
By Morris␣Rabkin
Attorney

United States Patent Office 2,700,151
Patented Jan. 18, 1955

2,700,151

ELECTRICAL PULSE ANALYZER

Leslie E. Flory, Princeton, N. J., assignor to Radio Corporation of America, a corporation of Delaware Application October 28, 1949, Serial No. 124,010

The terminal 15 years of the term of the patent to be granted has been disclaimed 7 Claims. (Cl. 340—213)

This invention relates to improvements in voltage pulse counting apparatus, and particularly to an improved apparatus for separating and counting pulses of differing magnitude.

In some instances, such as in nuclear disintegration studies, for example, it is necessary to sort and count the number of voltage pulses received by or generated in an apparatus during some selected time interval. In the specific case of nuclear disintegration, electrical particles are released with varying energies, and it is often desirable to sort these particles according to their energies, to count the number of particles in each energy band, and to plot a curve showing the distribution of the particles according to energy bands. In such case, it is the usual practice to pass the particles through a detecting device, such as a proportional Geiger-Müller counter, which will produce electrical pulses having amplitudes proportional to the particle energies. Thereafter, the pulses must be sorted and counted to obtain the desired information.

Pulse sorting and counting systems conventionally have taken the form of amplitude sensitive electrical networks which will sort the pulses according to amplitude, together with counting circuits to count the number of pulses passing through each network. After the counting has proceeded for the desired time interval, it is necessary to record the result in each counter and to plot a distribution curve from observed counter information. Since it is often necessary to sort the pulses into as many as 20 or more channels, the equipment required is cumbersome and the work laborious. Moreover, the pulse recurrence rate sometimes is higher than the upper frequency limit of the sorting and counting circuits, in which case the results obtained may be inaccurate.

It is, accordingly, a principal object of the present invention to provide an improved apparatus for separating and counting voltage pulses of differing magnitude.

Another object of the invention is to provide an improved pulse sorting and counting apparatus which does not require a separate counting circuit for each different pulse magnitude involved.

A further object of the invention is to provide an apparatus of the foregoing type capable of responding to pulses of high recurrence rate.

A further object of the invention is to provide an apparatus for obtaining pulse energy distribution information in the form of an energy distribution curve, thereby eliminating the necessity for plotting the curve manually from individual pulse counts.

In accordance with the invention, the foregoing and other related objects and advantages are attained by utilizing the voltage pulses involved to direct a cathode ray beam onto selected points on a "signal storage" target element in order to develop an incremental change in the stored signal at any given point every time the beam strikes that point. After any desired time interval, the total signal stored at each point can be measured as a measure of the number of pulses which acted to direct the beam onto each point, thereby providing a count of the number of pulses of each magnitude involved. Moreover, the stored signal can be measured in such manner that the desired information is available in the form of an energy distribution curve, thereby eliminating the necessity for manual plotting of individual pulse counts.

A more complete understanding of the invention can be had by reference to the following description of an illustrative embodiment thereof, when considered in connection with the accompanying drawing, in which Fig. 1 illustrates a pulse sorting and counting apparatus arranged in accordance with the invention;

Fig. 2 represents a possible distribution of electrical charges on a storage tube in Fig. 1; and Fig. 3 shows a trace on an oscilloscope in Fig. 1, produced by the electrical charges shown in Fig. 2, in accordance with the invention.

Referring more particularly to Fig. 1, there is shown a so-called storage type cathode ray tube 10 which may, for example, be similar to that described and claimed in the copending application of Arthur S. Jensen and Leslie E. Flory, Serial No. 22,848, filed April 23, 1948, now Patent No. 2,503,949, and assigned to the same assignee as the present invention.

The tube 10 contains an electron gun consisting of a cathode 12, a beam-intensity control grid 14, and a focusing anode 16 for forming a beam of electrons directed toward a target element 28. A shielding electrode 18, a pair of beam deflecting plates 20, a second shielding electrode 22, a secondary electron collecting electrode 24, and a screen or barrier grid 26 are disposed along the beam path, and each contributes to the tube operation in a manner to be explained.

The target element 28 comprises a metal support plate or back plate 30 having a dielectric layer 32, such as mica or the like, on the surface thereof facing the other electrodes in the tube 10. Electrons emitted from the cathode 12 will pass through the control grid 14, and will be accelerated and focused into a beam by the anode 16. This beam will pass through the shield electrodes 18, 22, and between the deflecting plates 20, and will continue toward the target 28. If the beam strikes the target 28 with sufficient velocity, secondary electrons will be emitted therefrom, and these secondary electrons will be collected by the electrode 24.

Assuming that the potential on the screen grid 26 is more positive than that on the back plate 30 of the target 28, and that the potential of the collecting electrode 24 is more positive than that of the screen 26, and also assuming that the electron beam has sufficient velocity to produce a secondary emission ratio greater than unity, secondary electrons will be emitted from the target surface at any point of beam impingement until the potential of the target surface at that point becomes substantially equal to the potential of the screen 26. If the electron beam is directed onto any given point on the target surface 28 for a period of time less than that necessary to bring the target surface at that point up to the potential of the screen 26, an incremental potential change will take place at that point. Accordingly, if the beam is directed onto any given target point repeatedly in response to pulses of equal magnitude, the charge at that point will change in proportion to the number of pulses received. Similarly, if the beam is directed onto different points in response to pulses of different amplitude, the charge at any given point will be determined by the number of pulses of corresponding amplitude occurring during the time interval of pulse reception. Therefore, a measurement of the charge at each point, at the end of the selected time interval, can be taken as a measure of the number of received pulses of each amplitude. The system provided for operating the tube in this manner will be described hereinafter.

As is explained in the aforementioned copending application, the target 28 need not necessarily be formed in the manner previously described, but may comprise an aluminum back plate having a dielectric surface of aluminum oxide, or may comprise any other appropriate insulating material on a conductive back plate. The principal requirement for the target structure is that the dielectric layer should have sufficiently high resistivity to prevent appreciable charge leakage either through or across the surface of the dielectric layer.

The deflecting plates 20 serve to direct the electron beam toward different points on the target 28, depending on the voltage applied between the plates 20 at any instant, although it will be obvious that the beam will be directed onto the target 28 only when the control grid voltage is such as to allow the beam to reach the target.

The shield electrode 22 serves to shield the collector electrode 24 from signals on the deflection plates 20, and both shield electrodes 18, 22 assist in maintaining axial symmetry of the beam focusing field.

Suitable operating voltages for the various tube electrodes are as indicated in the drawing, although it will be understood that the voltage values shown are purely illustrative.

In order to develop the desired charge pattern on the target 28, the deflection plates 20 are connected to a pair of input terminals 40 through a switch 42, a pulse delay circuit 44, and an amplifier 46, while the control grid 14 is connected to the input terminals 40 through a switch 47 and a network consisting of a pulse generator 48 and two differentiating circuits 50, 52. A bias voltage also is applied to the control grid 14 from a suitable source (not shown), to normally prevent the cathode ray beam from striking the target 28. As is indicated, the tube cathode 12 is connected to the operating voltage source (not shown), through a beam-current limiting resistor 54, while the screen 26 is furnished with a voltage intermediate between that on the collector 24 and the target 28 through a switch 56.

The purpose of the networks coupling the deflection plates 20 and the control grid 14 to the input terminals 40 is to ensure that the beam will be directed onto the target 28 only at the instant when an incoming pulse is at its maximum amplitude, and then only for a definite, reproducible time interval. It will be understood that the exact circuits required may vary somewhat if voltage pulses of differing waveshape are to be sorted, and that the networks shown are intended only to illustrate the principles of the invention for the case of a simple, "positive" pulse.

As is well known, a differentiator circuit, such as a capacitor-resistor combination, will convert a pulse applied thereto into an output waveform having a shape determined by the rates of change in the envelope of the applied pulse. Consequently, any pulse applied to the first differentiator 50 will be converted into a waveform having a reversal of slope at a point corresponding to the point of maximum amplitude of the input pulse. For example, a pulse having the waveform shown at A in the drawing will be converted into the waveform shown at B in the drawing, with the sharp negative slope in waveform B occurring at the same instant as the maximum positive point in pulse A. The waveform shown at B preferably is differentiated again to obtain a waveform having a very pronounced negative peak, as shown in waveform C. This negative peak is used to trigger the pulse generator 48, which may comprise a one-cycle multivibrator, for example, in order to generate a positive pulse D of controlled initiation and duration.

The positive pulse from the pulse generator 48 is applied to the control grid 14 of the tube 10, allowing the beam to impinge on the target 28 for a definite interval exactly at the time the beam is deflected the maximum amount by the pulse on the deflection plate 20. As shown, a delay circuit 44, such as a short section of transmission line or the like, may be provided between the input terminals 40 and the deflection plates 20 in order to allow time for the pulse generator 48 to operate, and, thus, to ensure that the beam will be directed onto the target 28 at the instant of maximum beam deflection.

Thus, each pulse applied to the input terminals 40 will cause the beam to be directed onto a target point determined by the pulse magnitude, causing an incremental change in charge as was previously explained. The resistor 54 in the tube cathode circuit will limit the beam current to ensure an equal charge change in each instance.

After the sorting and counting procedure has continued for any desired time, the tube connections are changed to allow evaluation of the information stored in the form of charges on the target 28.

In connecting the tube 10 to reproduce the information stored therein, the cathode resistor 54 is shorted by a switch 58 to permit full beam current to flow, the control grid 14 is switched by the switch 47 from the pulse generator 58 and from the cut-off bias voltage source to a bias voltage which will allow a beam of desired intensity to impinge on the target 28, while the deflection plates 20 are connected through the switch 42 to receive a sawtooth waveshape deflection voltage from a sawtooth signal generator 60. The generator 60 may comprise a relaxation oscillator or other similar circuit arranged for single cycle operation in any desired manner, as by means of a switch or by a trigger pulse from a suitable source. The screen 26 is connected through the switch 56 to a point having a potential equal to the average back plate potential.

The target back plate 30 has a resistor 64 connected in circuit therewith, and a cathode ray oscilloscope 66 has one set of deflection plates 68 connected to the resistor 64 and a second set of deflection plates 70 connected to the sawtooth generator 60. The oscilloscope 66 preferably has a "long persistence" screen to facilitate single trace viewing.

With the tube 10 connected for reproducing stored information, as just described, the cathode ray beam therein will sweep across the target 28, touching, in turn, each of the points at which charges have been developed during the recording process. As each such point is touched by the beam, the charge previously developed will be removed as the potential on the target surface at that point becomes equal to the screen potential, and this charge change will cause a current to flow in the resistor 64 due to the capacitive coupling between the surface 32 and the back plate 30. The resulting voltage developed across the resistor 64 will cause the beam in the oscilloscope 66 to be deflected in one direction (e. g. "vertically"), while the oscilloscope beam will be deflected in a direction normal thereto (e. g. "horizontally") by the sawtooth wave, and the composite result of scanning the entire target will appear as a trace on the screen of the oscilloscope 66. If desired, this trace can be photographed to obtain a permanent record.

It is evident that each point along the horizontal path of the oscilloscope trace will correspond to one of the points on the target surface 32, while the vertical deflection of the oscilloscope trace at each point will represent the charge stored at the corresponding point on the target surface 32. Consequently, the oscilloscope trace actually will be a curve of the energy distribution of pulses received during the measuring interval. For example, a graphic representation of a voltage pattern comprising a possible distribution of charges accumulated on the target surface 32 is shown in Fig. 2. Since these charges would normally be invisible, they are represented graphically, in Fig. 2, in a manner whereby the relative density of each of the discrete portions along the voltage pattern is proportional to the intensity of each of the charges at these discrete portions, respectively. When the charges in the example of the voltage pattern of Fig. 2 are transferred to the face of the oscilloscope 66, they will produce thereon the trace T of Fig. 3. The trace T, therefore, is the curve of distribution of the pulses received during the measuring interval.

Many modifications and changes are possible, in the specific apparatus shown, all within the scope and spirit of the invention. For example, the output load resistor 64 for tube 10 could be connected in circuit with the collector electrode 24, rather than in circuit with the target, so that the secondary emission current could be used as the information reproduction signal. Also, the oscilloscope 66 could be replaced by a storage tube of the type wherein a signal voltage can be stored, and can be reproduced at a later time without eliminating the stored signal. Such a tube is shown, for example, in the commonly owned copending application of J. A. Raichman, Serial No. 78,652, filed February 26, 1949. In view of such possible changes and modifications, the foregoing description is to be construed as illustrative, and not in a limiting sense.

What is claimed is:

1. Apparatus for separating and counting voltage pulses of differing magnitude, said apparatus comprising means for generating a beam of electrons, means to deflect said beam of electrons responsive to the magnitude of each of said pulses, a target electrode having a surface providing secondary emission when struck by said electron beam, means including a beam intensity control electrode and a source of bias voltage normally preventing said beam from striking said target, and means to overcome said bias responsive to each said pulse attaining its maximum magnitude to cause said beam to strike said target at a point determined by the maximum magnitude of each said pulse whereby to develop by secondary emission at each said point an electrical charge of magnitude determined by the number of times said beam is directed onto each said point, and means to measure and indicate the accumulated charge at each said point after a predetermined interval.

2. Voltage pulse sorting and counting apparatus, said apparatus comprising a pair of input terminals adapted to be connected to a source of differing magnitude voltage pulses, a cathode ray tube having an electron gun for generating an electron beam, said gun including a beam intensity control element, said tube also including a dielectric target element adapted to retain electric charges developed at separate points thereon by impingement of said electron beam and means to deflect said beam to selectable ones of said points, a circuit connecting said terminals to said beam deflecting means to deflect said beam to different ones of said selectable points in accordance with the differing magnitude of each of said voltage pulses, means connected between said intensity control element and said input terminals for converting each pulse applied to said terminals into a voltage pulse for intensifying said beam upon the maximum deflection thereof to said selectable points, and means to measure the charge at each said point after a predetermined interval.

3. Apparatus for separating voltage pulses of differing magnitude and for counting the number of pulses of each magnitude occurring during a predetermined time interval, said apparatus comprising a cathode ray tube including (1) an electron beam generator, (2) a target element having a surface adapted to emit secondary electrons when struck by said beam, (3) an electrode for controlling the intensity of said beam, (4) electrodes for deflecting said beam toward different points on said target, and (5) an element for collecting secondary electrons emitted from said target, a bias voltage source connected to said control electrode and normally cutting off said beam, means to apply said voltage pulses to said deflecting electrodes to deflect said beam to points on said target determined by the magnitude of each said pulse means to differentiate twice each of said voltage pulses, a pulse generator, means to apply each of said twice differentiated voltage pulses to said pulse generator to obtain a timing pulse occurring during the maximum magnitude of the corresponding voltage pulse, means to apply each of said timing pulses to said intensity control electrode to turn on said beam at the maximum magnitude of the corresponding pulses whereby to develop by secondary emission at each said point an electrical charge of magnitude determined by the number of times said beam is directed onto each said point during said time interval, a source of sawtooth waveshape voltage waves for deflecting said beam sequentially to each said target point, means to selectably connect said deflection electrodes either to said voltage deriving means or to said sawtooth wave source, a first circuit connecting said elements and including voltage source means for applying between said elements a voltage of one predetermined magnitude, a second circuit connecting said elements and including voltage source means for applying between said elements a voltage of second predetermined magnitude, means for selectably opening one or the other of said circuits, and means connected to one of said circuits and to said sawtooth wave source for measuring the magnitude of the current in said one circuit at each instant during one wave cycle of said wave source as a measure of the charge at each said point on said target.

4. Apparatus for separating voltage pulses of differing magnitude and for counting the number of pulses of each magnitude, said apparatus comprising a cathode ray tube having an evacuated envelope, means within said envelope for generating a beam of electrons, a target element in said envelope having a surface adapted to emit secondary electrons when struck by said beam, an electrode in said envelope for controlling the intensity of said beam, electrodes in said envelope for deflecting said beam across said target, an element in said envelope for collecting secondary electrons emitted from said target, voltage source means connected to said intensity control electrode and normally preventing said beam from reaching said target, means to differentiate twice each of said voltage pulses, a pulse generator, means to apply each of said twice differentiated voltage pulses to said pulse generator to obtain a timing pulse occurring during the maximum magnitude of the corresponding voltage pulse, a delay line having a delay equal to the time required by said pulse generator to operate, means to apply each voltage pulse to said deflection electrodes through said delay line, means to apply said timing pulses to said intensity control electrode to turn on said beam at the maximum magnitude of the corresponding voltage pulse whereby said beam is directed onto said target at points determined by the maximum magnitude of each said pulse whereby to develop by secondary emission at each said point an electrical charge of magnitude determined by the number of times said beam is directed onto each said point, a source of sawtooth waveshape voltage, means to connect said deflection electrodes selectably to said control voltage deriving means or to said sawtooth wave source, a first circuit connecting said target element and said electron collecting element and including voltage source means for applying a voltage of one predetermined magnitude between said elements, a second circuit connecting said target element and said electron collecting element and including voltage source means for applying a voltage of another predetermined magnitude between said elements, switch means for selectably opening one or the other of said circuits, and means connected to one of said circuits and to said sawtooth wave source for indicating the magnitude of the current in one of said circuits at each instant during one wave cycle of said sawtooth wave source.

5. Apparatus for separating and counting voltage pulses of differing magnitude comprising a cathode ray tube including means to generate an electron beam, a storage target, means to control said beam intensity, means to deflect said beam, bias means coupled to said beam intensity control to maintain said beam biased off, means to apply each of said voltage pulses to said beam deflecting means to deflect said beam responsive to each of said pulses, means to derive a pulse from each of said pulses which occurs during the interval when each of said pulses attains its maximum amplitude, means to apply each of said derived pulses to said beam intensity control to permit said beam to strike said target only when the beam deflecting pulse attains its maximum amplitude whereby there is stored at each point of said storage target a charge of magnitude determined by the number of pulses of each said different magnitude applied to said apparatus, and means for scanning said target to develop a voltage wave representative of the total charge at each point of said target.

6. Apparatus as recited in claim 5 wherein said means to derive a pulse from each of said pulses during the interval when each of said pulses attains its maximum amplitude comprises a first and a second differentiating means connected in series, means to apply said voltage pulses to said first differentiating means, a pulse generator connected to the output of said second differentiating means, means to bias said pulse generator to be responsive solely to the output of said second differentiator caused by the wave shape about the maximum point of said voltage pulses.

7. Apparatus as recited in claim 6 wherein said each of said voltage pulses to said beam deflecting means includes a delay line having a delay determined by the time required for said pulse generator to operate.

References Cited in the file of this patent

UNITED STATES PATENTS

| Number | Name | Date |
|---|---|---|
| 2,130,134 | Iams | Sept. 13, 1938 |
| 2,137,888 | Fuller | Nov. 22, 1938 |
| 2,269,226 | Rohats | Jan. 6, 1942 |
| 2,379,880 | Burgess | July 10, 1945 |
| 2,398,988 | Ziebolz | Apr. 23, 1946 |
| 2,433,340 | Burgess | Dec. 30, 1947 |
| 2,445,964 | Owen | July 27, 1948 |
| 2,458,030 | Rea | Jan. 4, 1949 |
| 2,464,420 | Snyder | Mar. 15, 1949 |
| 2,473,691 | Meacham | June 21, 1949 |
| 2,501,788 | Ross | Mar. 28, 1950 |
| 2,538,065 | Wallace | Jan. 16, 1951 |
| 2,548,789 | Hergenrother | Apr. 10, 1951 |

OTHER REFERENCES

Ten-Channel Electrostatic Pulse Analyzer, Watkins, Review of Scientific Instruments, pages 495–499, vol. 20, No. 7, July 1949.